United States Patent
Shao et al.

(10) Patent No.: US 11,158,469 B2
(45) Date of Patent: Oct. 26, 2021

(54) FRAMEWORK STRUCTURE AND KEYBOARD DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Min-Chuan Shao, Taipei (TW); Cheng-Hsiung Huang, Taipei (TW); Ming-Fu Yen, Taipei (TW); Jian-Jhih Chen, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 17/037,316

(22) Filed: Sep. 29, 2020

(65) Prior Publication Data
US 2021/0208692 A1 Jul. 8, 2021

Related U.S. Application Data

(60) Provisional application No. 62/956,362, filed on Jan. 2, 2020.

(30) Foreign Application Priority Data
Jul. 28, 2020 (CN) .......................... 202010737593.5

(51) Int. Cl.
*G06F 3/02* (2006.01)
*H01H 13/10* (2006.01)
*H01H 13/14* (2006.01)
*H01H 13/52* (2006.01)
*H01H 13/7073* (2006.01)

(52) U.S. Cl.
CPC ........... *H01H 13/10* (2013.01); *G06F 3/0219* (2013.01); *H01H 13/14* (2013.01); *H01H 13/52* (2013.01); *H01H 13/7073* (2013.01)

(58) Field of Classification Search
CPC .................................................... G06F 3/0219
USPC ........................................................ 345/168
See application file for complete search history.

(56) References Cited

U.S. PATENT DOCUMENTS

| | | | | |
|---|---|---|---|---|
| 4,959,810 A | * | 9/1990 | Darbee | G08C 19/28 340/12.22 |
| 5,565,657 A | * | 10/1996 | Merz | G06F 3/04144 178/18.01 |
| 5,870,282 A | * | 2/1999 | Andre | G06F 1/1656 361/679.57 |

(Continued)

*Primary Examiner* — Albert K Wong
(74) *Attorney, Agent, or Firm* — Innovation Counsel LLP

(57) ABSTRACT

A framework structure and a keyboard device are provided. The framework structure is applicable to a keyboard module. The keyboard module includes multiple standard keys and multiple function keys. The framework structure includes a frame and a rib portion. The frame correspondingly surrounds the keyboard module. The rib portion is formed in the frame and divides the area in the frame into a first region and a second region. The first region corresponds to the area defined by the standard keys of the keyboard module, and the second region corresponds to the function keys of the keyboard module.

20 Claims, 8 Drawing Sheets

(56) References Cited

U.S. PATENT DOCUMENTS

| | | | |
|---|---|---|---|
| 2001/0010503 A1* | 8/2001 | Darbee | H04N 21/42219 |
| | | | 341/176 |
| 2004/0085716 A1* | 5/2004 | Uke | H01H 13/84 |
| | | | 361/679.08 |
| 2019/0164704 A1* | 5/2019 | Blatt | H01H 9/02 |
| 2020/0125191 A1* | 4/2020 | Cherney | G06F 3/0488 |

* cited by examiner

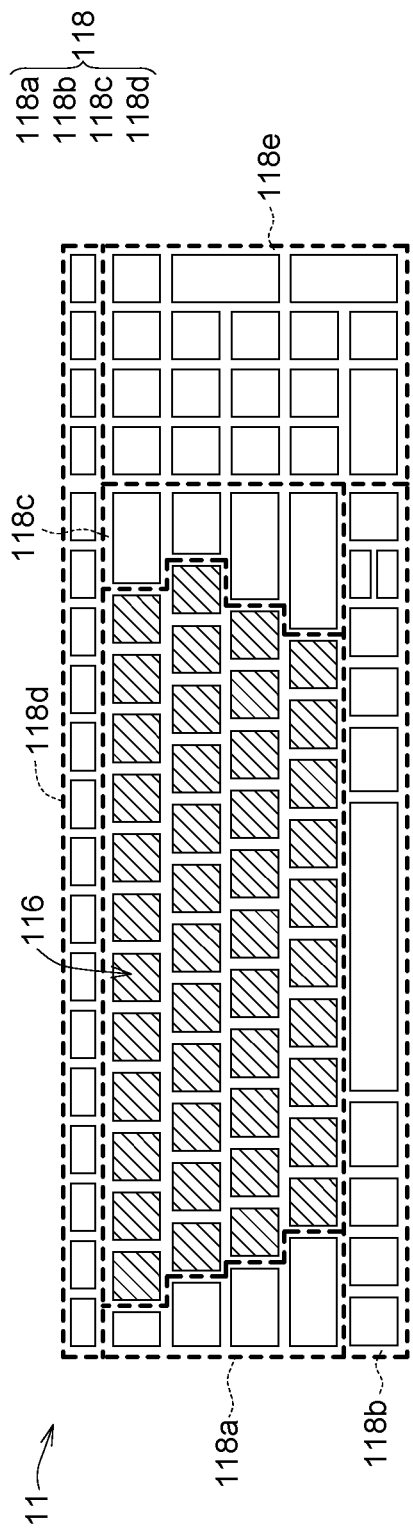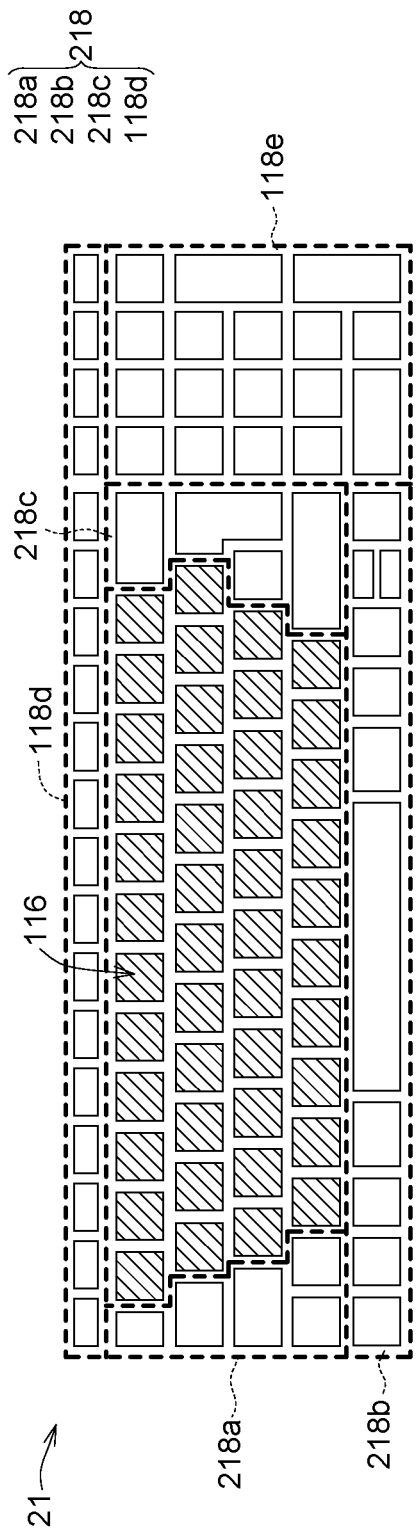

FRAMEWORK STRUCTURE AND KEYBOARD DEVICE

This application claims the benefit of U.S. Provisional Application No. 62/956,362, filed Jan. 2, 2020, and the benefit of People's Republic of China patent application Serial No. 202010737593.5, filed Jul. 28, 2020, the invention of which are incorporated by reference herein in its entirety.

BACKGROUND OF THE INVENTION

Field of the Invention

The invention relates in general to a framework structure and a keyboard device, and more particularly to a framework structure and a keyboard device applicable to the keyboard module for different languages.

Description of the Related Art

The keyboard device is an indispensable input interface to the computer device (such as notebook computer, desktop computer, mobile device, game console, or service work machine) and is used for the user to input commands. The keyboard device normally includes a framework structure. Generally speaking, the framework structure can cover the gap between the keys of the keyboard module to avoid external objects (such as liquid or dusts) infiltrating the keyboard device and causing damages.

However, in response to language differences between countries and states, the arrangement of the keys in the keyboard module may vary due to language difference. Therefore, when developing the mold of a framework structure, the keyboard modules for different languages may require different molds. For example, three molds are required for the framework structure to be used in the keyboard modules for the US, the UK and the JP languages, respectively.

SUMMARY OF THE INVENTION

The invention is directed to a framework structure and a keyboard device which are applicable to the keyboard modules for different languages.

According to one embodiment of the present invention, a framework structure applicable to a keyboard module is provided. The keyboard module includes multiple standard keys and multiple function keys. The framework structure includes a frame and a rib portion. The frame correspondingly surrounds the keyboard module. The rib portion is formed in the frame and divides the area in the frame into a first region and a second region. The first region corresponds to the area defined by the standard keys of the keyboard module, and the second region corresponds to the function keys of the keyboard module.

The said framework structure, wherein the second region has a hollowed area corresponding to at least three keys of the function keys.

The said framework structure, wherein the first region is hollowed.

The said framework structure, wherein the second region is hollowed.

The said framework structure, wherein the framework structure further includes at least one first division rib arranged between the rib portion and the frame, and the second region is divided into multiple sub-function regions by the first division rib.

The said framework structure, wherein the first division rib is arranged in a horizontal manner.

The said framework structure, wherein the framework structure further includes at least one third division rib arranged between the first division rib and the frame, and a third region corresponding to multiple number keys of the keyboard module is separated from the area in the frame by the third division rib.

The said framework structure, wherein the third region is hollowed.

The said framework structure, wherein the framework structure further includes at least one second division rib extended within the rib portion, and the first region is divided into multiple sub-key regions by the second division rib.

The said framework structure, wherein the at least one second division rib is adjacently arranged in a horizontal manner.

The said framework structure, wherein the at least one second division rib is adjacently arranged in a horizontal manner and a vertical manner.

The said framework structure, wherein the sub-key regions respectively correspond to one of the standard keys of the keyboard module.

According to another embodiment of the present invention, a keyboard device is provided. The keyboard device includes a keyboard module and a framework structure. The keyboard module includes a bottom plate, and multiple standard keys and multiple function keys arranged on the bottom plate. The framework structure includes multiple connection structures and is coupled with the bottom plate of the keyboard module through the connection structures. The framework structure further includes a frame and a rib portion. The frame correspondingly surrounds the keyboard module. The rib portion is formed in the frame and divides the area in the frame into a first region and a second region. The first region corresponds to the area defined by the standard keys of the keyboard module, and the second region corresponds to the function keys of the keyboard module.

The said keyboard device, wherein the second region has a hollowed area corresponding to at least three keys of the function keys.

The said keyboard device, wherein the first region is hollowed.

The said keyboard device, wherein the second region is hollowed.

The said keyboard device, wherein the framework structure further includes at least one first division rib arranged between the rib portion and the frame, and the second region is divided into multiple sub-function regions by the first division rib.

The said keyboard device, wherein the first division rib is arranged in a horizontal manner.

The said keyboard device, wherein the framework structure further includes at least one third division rib arranged between the first division rib and the frame, and a third region corresponding to multiple number keys of the keyboard module is separated from the area in the frame by the third division rib.

The said keyboard device, wherein the third region is hollowed.

The said keyboard device, wherein the framework structure further includes at least one second division rib extended within the rib portion, and the first region is divided into multiple sub-key regions by the second division rib.

The said keyboard device, wherein the at least one second division rib is adjacently arranged in a horizontal manner.

The said keyboard device, wherein the at least one second division rib is adjacently arranged in a horizontal manner and a vertical manner.

The said keyboard device, wherein the sub-key regions respectively correspond to one of the standard keys of the keyboard module.

The present invention has the effect that the framework structure and the keyboard device are applicable to the keyboard modules for different languages.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 1A is a schematic diagram of a first type keyboard module according to another embodiment of the present invention.

FIG. 1B is a schematic diagram of a second type keyboard module according to another embodiment of the present invention.

DETAILED DESCRIPTION OF THE INVENTION

Detailed descriptions of each embodiment of the present invention are disclosed below with reference to accompanying drawings. Apart from the said detailed descriptions, any embodiments in which the present invention can be used as well as any substitutions, modifications or equivalent changes of the said embodiments are within the scope of the present invention, and the descriptions and definitions in the claims shall prevail. Many specific details and embodiments are disclosed in the specification for anyone ordinary skilled in the art to comprehensively understand the present invention, not for limiting the present invention. Moreover, generally known procedures or elements are not disclosed to avoid adding unnecessary restrictions to the present invention.

The principles of the structure and operation of the present invention are disclosed below with reference to accompanying drawings.

Figure 1C:
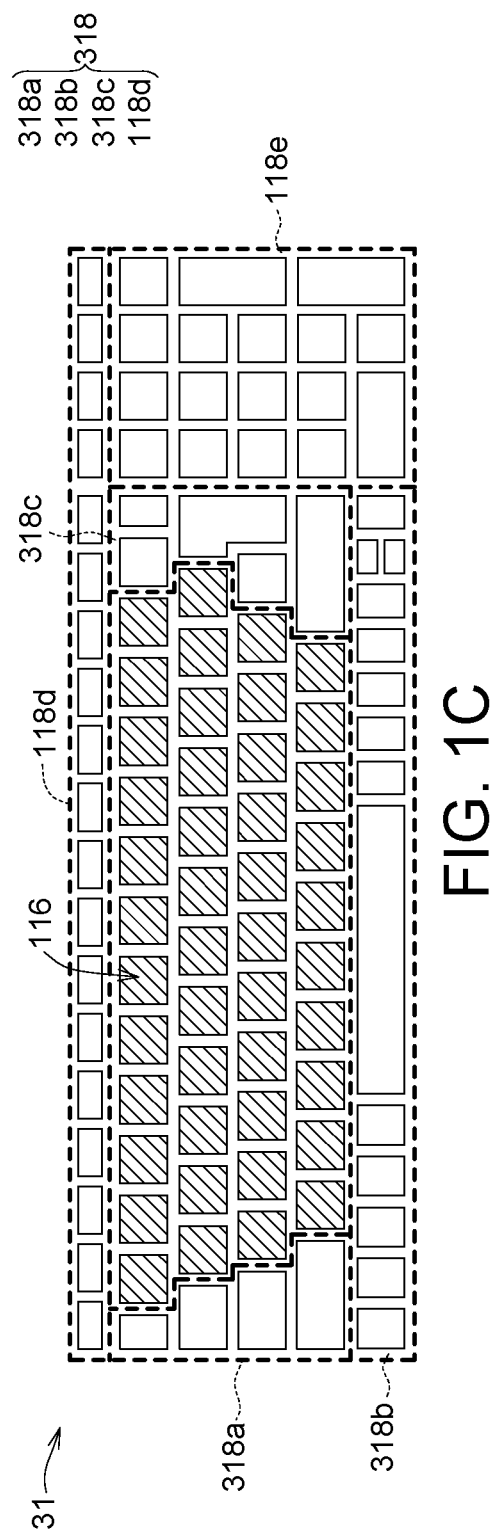
FIG. 1C is a schematic diagram of a third type keyboard module according to another embodiment of the present invention.
Figure 10:
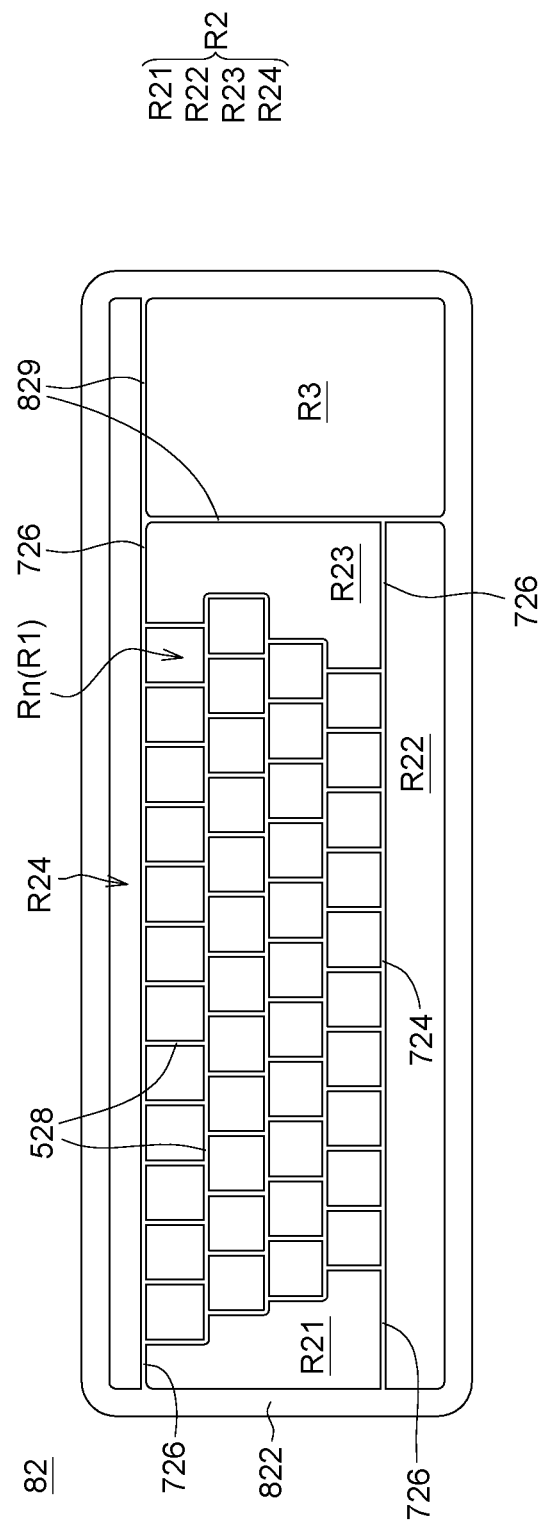
FIG. 10 is a schematic diagram of another deformed framework structure according to the embodiment of FIG. 9.

FIG. 1A is a schematic diagram of a first type keyboard module 11 for the US language according to another embodiment of the present invention. FIG. 1B is a schematic diagram of a second type keyboard module 21 for the UK language according to another embodiment of the present invention. FIG. 10 is a schematic diagram of a third type keyboard module 31 for the JP language according to another embodiment of the present invention.

Refer to FIG. 1A, FIG. 1B and FIG. 10. The keyboard modules 11, 21 and 31 substantially can be divided into at least two blocks, namely, the standard key block 116 and the function key blocks 118, 218 and 318, wherein at least three sides of the standard key block 116 are surrounded by the function key blocks 118, 218 and 318. Each of the keyboard modules 11, 21 and 31 includes multiple standard keys arranged as four rows in the standard key block 116 in a top down manner. The keyboard modules 11, 21 and 31 further include multiple function keys arranged in the function key blocks 118, 218 and 318, respectively.

In an embodiment, the function key blocks 118, 218 and 318, respectively include first sub-blocks 118a, 218a and 318a, second sub-blocks 118b, 218b and 318b, and third sub-blocks 118c, 218c and 318c. Each of the first sub-blocks 118a, 218a and 318a is located at the left-hand side of the standard key block 116 and corresponds to four rows of function keys arranged in a top down manner. Each of the second sub-blocks 118b, 218b and 318b is located at the bottom of the standard key block 116 and corresponds to one row of function keys. Each of the third sub-blocks 118c, 218c and 318c is located at the right-hand side of the standard key block 116 and corresponds to four rows of function keys arranged in a top down manner. Therefore, three sides of the standard key block 116 are respectively surrounded by the first sub-blocks 118a, 218a and 318a, the second sub-blocks 118b, 218b and 318b and the third sub-blocks 118c, 218c and 318c.

In another embodiment, each of the function key blocks 118, 218 and 318 further includes a fourth sub-block 118d which is arranged on the top of the standard key block 116 and corresponds to one row of function keys. Thus, the four sides of the standard key block 116 are respectively surrounded by the first sub-blocks 118a, 218a and 318a, the second sub-blocks 118b, 218b and 318b, the third sub-blocks 118c, 218c and 318c, and the fourth sub-block 118d.

In an alternate embodiment, each of the keyboard modules 11, 21 and 31 further includes a number key block 118e. Each of the keyboard modules 11, 21 and 31 includes five rows of number keys arranged in the number key block 118e in a top down manner. Generally speaking, the number key block 118e is located at the right-hand side of the standard key block 116 and each of the function key blocks 118, 218 and 318.

As indicated in FIG. 1A, FIG. 1B and FIG. 10, all standard keys (slashed and shaded) are consistently arranged in the standard key block 116. Conversely, the function keys in the function key blocks 118, 218 and 318 (particularly, the function keys in the first sub-blocks 118a, 218a and 318a, the second sub-blocks 118b, 218b and 318b and the third sub-blocks 118c, 218c and 318c) may have inconsistent arrangement due to language differences between countries and states.

For example, the arrangement of the function key in the fourth row of the first sub-block 218a corresponding to the UK is inconsistent with that of the function key in the fourth row of the first sub-blocks 118a and 318a corresponding to the US language and the JP language, respectively. The arrangement of the function keys in the second sub-block 318b corresponding to the JP language is obviously inconsistent with that of the function keys in the second sub-blocks 118b and 218b corresponding to the US language and the UK language respectively. The arrangements of the function keys in the third sub-block 118c corresponding to the US language, the third sub-block 218c corresponding to the UK language and the third sub-block 318c corresponding to the JP language are inconsistent.

With respect to the above arrangement differences, the present invention provides a framework structure applicable to the keyboard modules 11, 21 and 31 for different languages to reduce the development cost of the mold.

Figure 2:
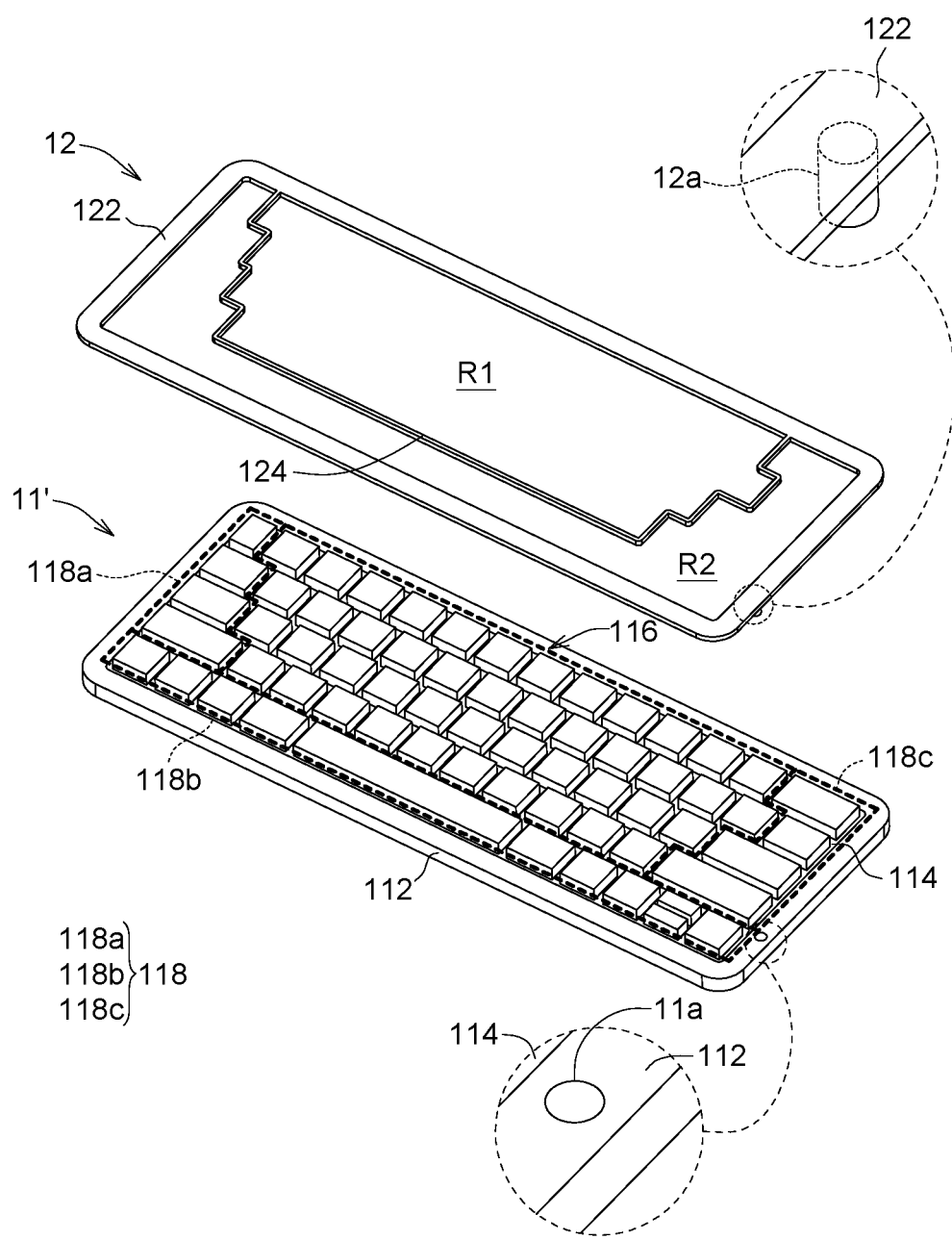
FIG. 2 is an explosion diagram of a keyboard device according to another embodiment of the present invention.

Referring to FIG. 2, an explosion diagram of a keyboard device 1 according to another embodiment of the present invention is shown. The keyboard device 1 includes a key module 11' and a framework structure 12. The present embodiment is exemplified by the keyboard module 11' for the US language. The keyboard module 11' is similar to the keyboard module 11 of FIG. 1A but excludes the fourth sub-block 118d and the number key block 118e. It should be understood that the framework structure 12 can also be used in the keyboard module for other languages, such as the keyboard module 21 for the UK language of FIG. 1B and the keyboard module 31 for the JP language of FIG. 10.

The keyboard module 11' includes a bottom plate 112, a thin-film circuit board 114 arranged on the bottom plate 112, and multiple keys arranged on the bottom plate 112. The multiple keys arranged on the bottom plate 112 include multiple standard keys arranged in the standard key block 116 and multiple function keys arranged in the first sub-block 118a, the second sub-block 118b and the third sub-block 118c.

The material of the framework structure 12 includes but is not limited to plastics, metal or a combination of plastics and metal (such as aluminum skin and plastic bone). The framework structure 12 includes multiple connection structures 12a, which can be arranged at any position of the framework structure 12, and the framework structure 12 can be coupled with the bottom plate 112 of the keyboard module 11' through the connection structures 12a. For example, in an embodiment, the connection structure 12a can be realized by a hot melt column, the bottom plate 112 of the keyboard module 11' has a through hole 11a, and the connection structure 12a can be extended to the through hole 11a and coupled together by way of hot melting. In another embodiment, the connection structure 12a can be realized by a column on which screw can be locked, the bottom plate 112 of the keyboard module 11' has a through hole 11a, the connection structure 12a can be extended to the through hole 11a, and the screw can be locked on the connection structure 12a and press the bottom plate 112, such that the framework structure 12 can be coupled with the bottom plate 112 of the keyboard module 11'. In other embodiments, the connection structure 12a can be realized by an engagement structure, the bottom plate 112 of the keyboard module 11' has a corresponding engagement structure, and the two engagement structures can be coupled together.

Figure 3:
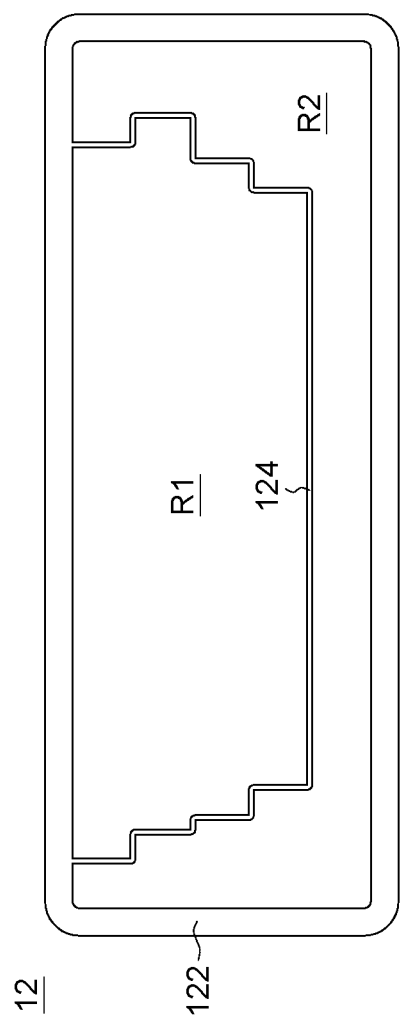
FIG. 3 is a schematic diagram of the framework structure of FIG. 2.

FIG. 3 is a schematic diagram of the framework structure 12 of FIG. 2. Refer to FIG. 2 and FIG. 3. The framework structure 12 includes a frame 122 and a rib portion 124 formed in the frame 122. The frame 122 correspondingly surrounds the keyboard module 11'. Let the embodiment of FIG. 2 be taken for example. The frame 122 correspondingly surrounds all standard keys arranged in the standard key block 116 and all function keys arranged in the first sub-block 118a, the second sub-block 118b and the third sub-block 118c.

In the present embodiment as indicated in FIG. 2 and FIG. 3, the rib portion 124 is connected to the frame 122. The area in the frame 122 is divided into a first region R1 and a second region R2 by the rib portion 124. The first region R1 corresponds to all standard keys in the standard key block 116 of the keyboard module 11', and the second region R2 corresponds to all function keys in the first sub-block 118a, the second sub-block 118b and the third sub-block 118c of the keyboard module 11'.

In the present invention, the first region R1 and the second region R2 are separated from each other by the rib portion 124. That is, the framework structure 12 separates the first region R1 and the second region R2 region using the rib portion 124. Thus, the keyboard modules for different languages can share the framework structure manufactured using the same mold.

In the keyboard modules 11, 21 and 31 as indicated in FIG. 1A to FIG. 10, the arrangements of the standard keys (slashed and shaded) in the standard key block 116 normally are consistent among the keyboard modules 11, 21 and 31, but the arrangements of the function keys in the function key blocks 118, 218 and 318 may be inconsistent due to language differences. If the first region R1 and the second region R2 respectively corresponding to the standard key block and the function key block can be separated, and a completely or partly hollowed area, covering the function keys inconsistently arranged in the function key blocks 118, 218 and 318 due to language differences, can be formed in the second region R2, the manufacturers do not have to develop a new mold in response to the inconsistent arrangement of the function keys.

In the present embodiment as indicated in FIG. 2 and FIG. 3, the first region R1 is completely hollowed, and the second region R2 is also completely hollowed. Thus, of the keyboard module 11', the gap of adjacent keys between the standard key block 116 and the function key block 118 can be covered by the rib portion 124.

Figure 4:
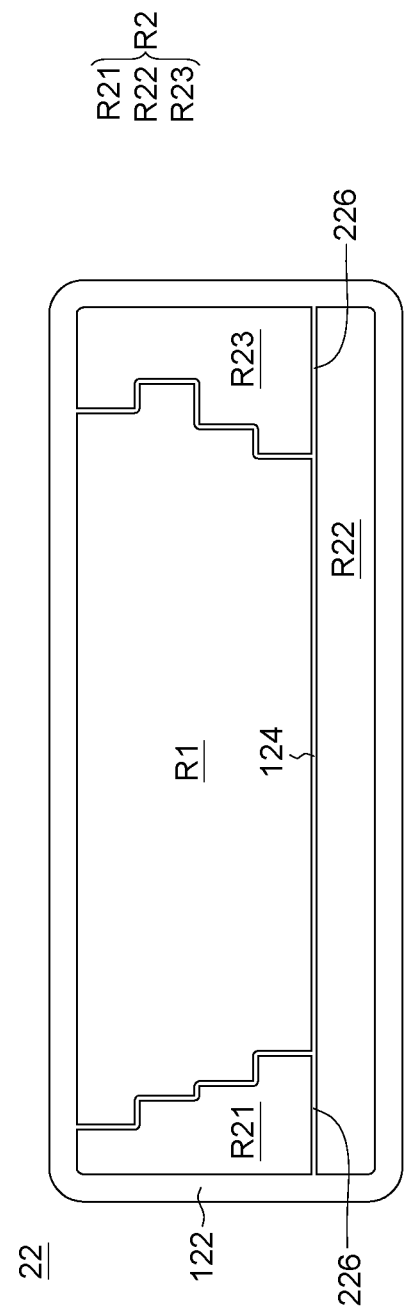
FIG. 4 is a schematic diagram of a framework structure according to another embodiment of the present invention.

Referring to FIG. 4, a schematic diagram of a framework structure 22 according to another embodiment of the present invention is shown. The present embodiment is different from the embodiment of FIG. 3 in that the framework structure 22 of FIG. 4 further includes at least one first division rib 226, and other identical or similar arrangements or elements are not repeated here.

The first division rib 226 is arranged between the rib portion 124 and the frame 122. Specifically, the first division rib 226 is extended from the rib portion 124 and connected between the rib portion 124 and the frame 122. In the present embodiment, two first division ribs 226 are arranged in a horizontal manner and divide the second region R2 into multiple sub-function regions, such as first sub-function region R21, second sub-function region R22 and third sub-function region R23. The first sub-function region R21 is located at the left-hand side of the first region R1 and corresponds to the first sub-blocks 118a, 218a and 318a of the keyboard modules 11, 21 and 31 of FIG. 1A to FIG. 10, respectively. The second sub-function region R22 is located at the bottom of the first region R1 and corresponds to the second sub-blocks 118b, 218b and 318b of the keyboard modules 11, 21 and 31 of FIG. 1A to FIG. 10, respectively. The third sub-function region R23 is located at the right-hand side of the first region R1 and corresponds to the third sub-blocks 118c, 218c and 318c of the keyboard modules 11, 21 and 31 of FIG. 1A to FIG. 10, respectively. Thus, of the keyboard modules 11, 21 and 31, the gap of adjacent keys between the first sub-blocks 118*a*, 218*a* and 318*a* and the second sub-blocks 118*b*, 218*b*, 318*b* can be covered by the first division rib 226 at the left-hand side, and the gap of adjacent keys between the second sub-blocks 118*b*, 218*b*, 318*b* and the third sub-blocks 118*c*, 218*c*, 318*c* can be covered by the first division rib 226 at the right-hand side.

Figure 5:
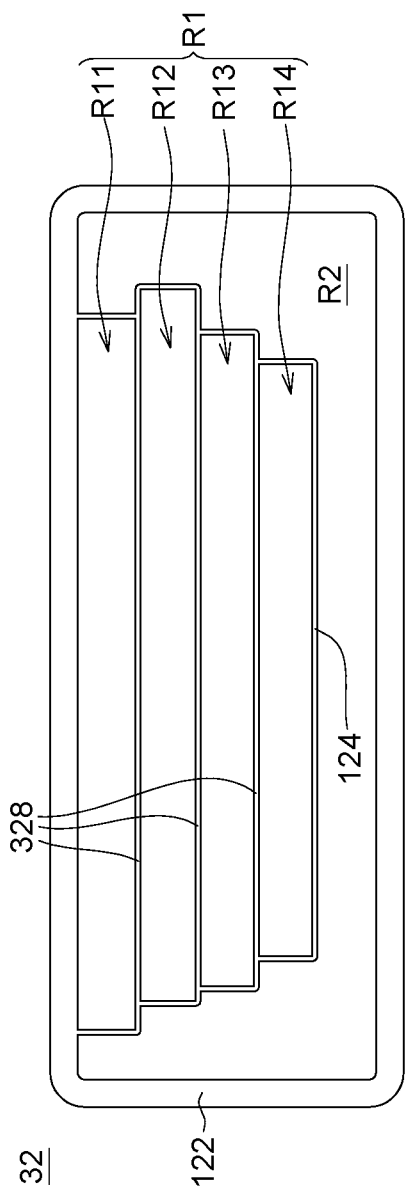
FIG. 5 is a schematic diagram of a deformed framework structure according to the embodiment of FIG. 3.

Referring to FIG. 5, a schematic diagram of a deformed framework structure 32 according to the embodiment of FIG. 3 is shown. The present embodiment is different from the embodiment of FIG. 3 in that the framework structure 32 of FIG. 5 further includes at least one second division rib 328, and other identical or similar arrangements or elements are not repeated here.

The at least one second division rib 328 is extended within the rib portion 124. the present embodiment, multiple second division ribs 328 are arranged in a horizontal manner and further divide the first region R1 into multiple sub-key regions R11, R12, R13, R14. The multiple sub-key regions are respectively formed of four rows of hollowed area respectively corresponding to one row of standard keys in the standard key block 116 of the keyboard modules 11, 21 and 31 of FIG. 1A to FIG. 10, respectively. Thus, the gap of standard keys between adjacent rows of the standard key block 116 of the keyboard modules 11, 21 and 31 can be covered by one of the second division ribs 328.

Figure 6:
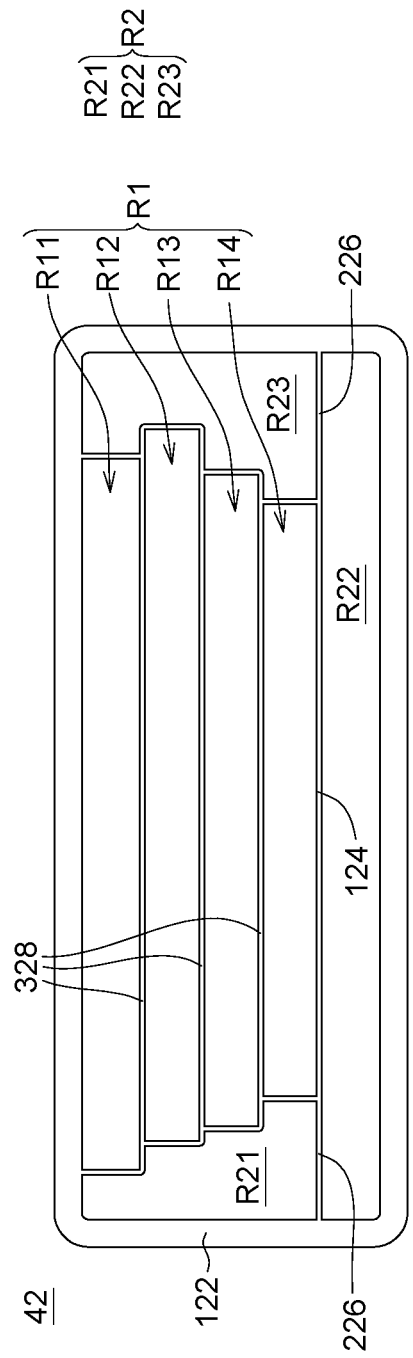
FIG. 6 is a schematic diagram of a deformed framework structure according to the embodiment of FIG. 4.

Referring to FIG. 6, a schematic diagram of a deformed framework structure 42 according to the embodiment of FIG. 4 is shown. The present embodiment is different from the embodiment of FIG. 4 in that the framework structure 42 of FIG. 6 further includes at least one second division rib 328, and other identical or similar arrangements or elements are not repeated here. The arrangement of the second division rib 328 of FIG. 6 is similar to that of the second division rib 328 of FIG. 5, and the similarities are not repeated here.

Figure 7:
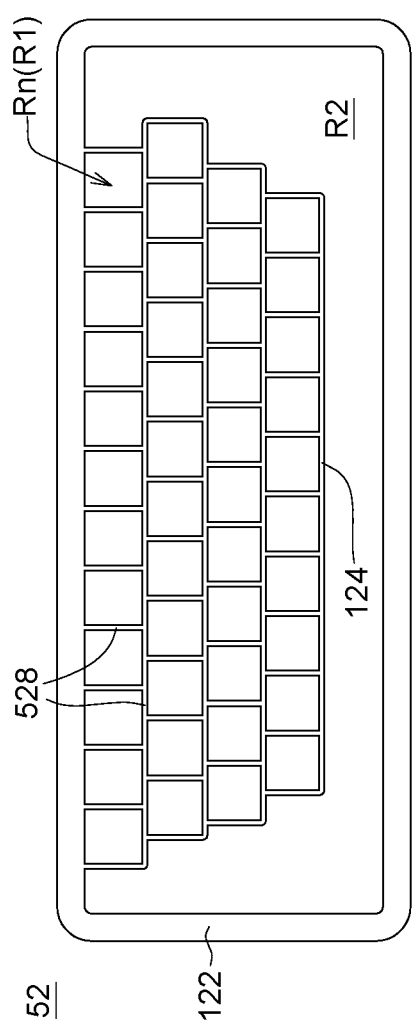
FIG. 7 is a schematic diagram of another deformed framework structure according to the embodiment of FIG. 3.

Referring to FIG. 7, a schematic diagram of another deformed framework structure 52 according to the embodiment of FIG. 3 is shown. The present embodiment is different from the embodiment of FIG. 3 in that the framework structure 52 of FIG. 7 further includes multiple second division ribs 528 adjacently arranged in a horizontal manner and a vertical manner, and other identical or similar arrangements or elements are not repeated here.

The second division ribs 528 are extended within the rib portion 124 and connected between the rib portion 124 and the frame 122. The second division ribs 528 further divide the first region R1 into multiple sub-key regions Rn. The sub-key regions Rn respectively correspond to one of the standard keys in the standard key block 116 of the keyboard modules 11, 21 and 31 of FIG. 1A to FIG. 10, respectively. Thus, the gap between adjacent standard keys in the standard key block 116 of the keyboard modules 11, 21 and 31 can be covered by the second division ribs 528.

Figure 8:
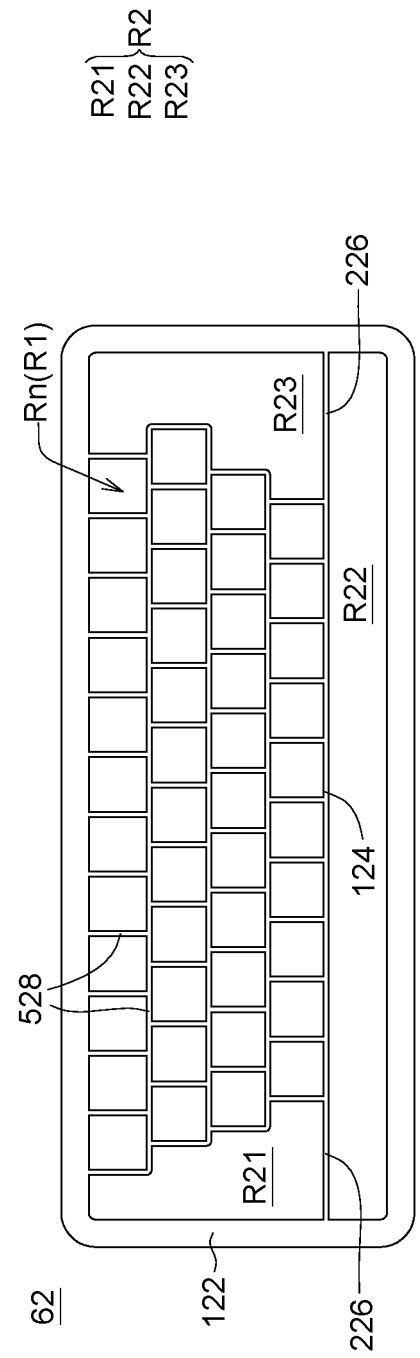
FIG. 8 is a schematic diagram of another deformed framework structure according to the embodiment of FIG. 4.

Referring to FIG. 8, a schematic diagram of another deformed framework structure 62 according to the embodiment of FIG. 4 is shown. The present embodiment is different from the embodiment of FIG. 4 in that the framework structure 62 of FIG. 8 further includes multiple second division ribs 528, and other identical or similar arrangements or elements are not repeated here. The arrangement of the second division rib 528 of FIG. 8 is similar to that of the second division rib 528 of FIG. 7, and the similarities are not repeated here.

Figure 9:
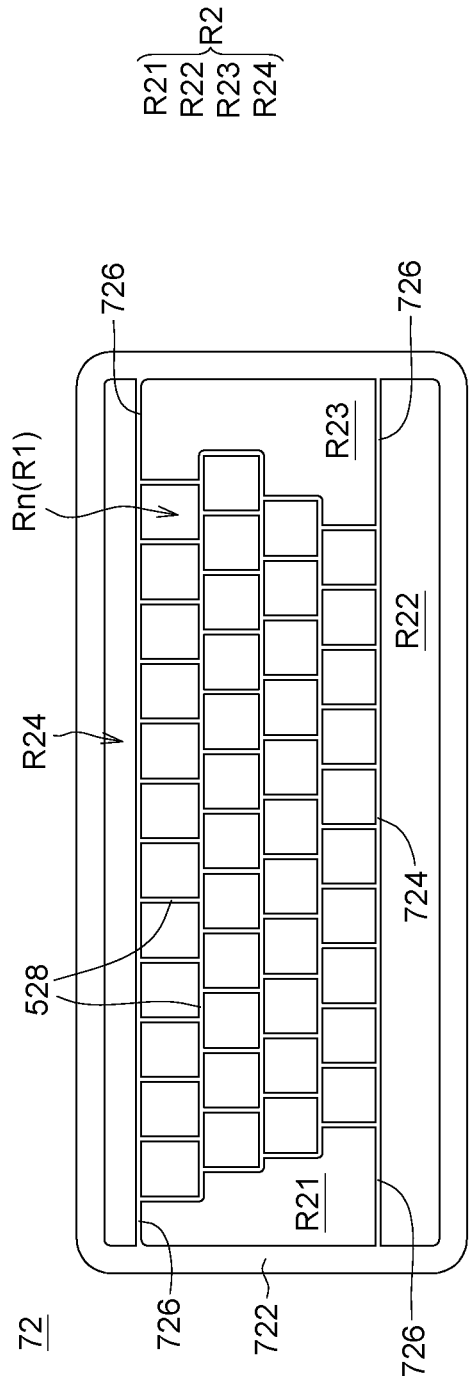
FIG. 9 is a schematic diagram of another deformed framework structure according to the embodiment of FIG. 8.

Referring to FIG. 9, a schematic diagram of another deformed framework structure 72 according to the embodiment of FIG. 8 is shown. The present embodiment is different from the embodiment of FIG. 8 in that the deformed framework structure 72 of FIG. 9 further includes a rib portion 724 and a first division rib 726, and the area of the frame 722 of FIG. 9, in comparison to the frame 122 of FIG. 8, further include a fourth sub-function region R24, and other identical or similar arrangements or elements are not repeated here.

The fourth sub-function region R24 is separated from the second region R2 in the frame 722 by the first division rib 726. The first division rib 726 is arranged in a horizontal manner, and is connected between the rib portion 724 and the frame 722, wherein two first division ribs are extended left-ward from the rib portion 724 and are connected to the frame 722, and other two first division ribs are extended rightward from the rib portion 724 and are connected to the frame 722, such that the rib portion 724 is connected to the frame 722 through the first division rib 726, and multiple second division ribs 528 adjacently arranged in a horizontal manner and a vertical manner, are connected to the rib portion 724.

As indicated in FIG. 9, the fourth sub-function region R24 is located at the top of the first region R1 and corresponds to the fourth sub-block 118*d* of the keyboard modules 11, 21 and 31 of FIG. 1A to FIG. 10, respectively. In an embodiment, the fourth sub-function region R24 is completely hollowed, but the present invention is not limited thereto.

Referring to FIG. 10, a schematic diagram of another deformed framework structure 82 according to the embodiment of FIG. 9 is shown. The present embodiment is different from the embodiment of FIG. 9 in that the framework structure 82 further includes at least one third division rib 829, and the area in the frame 822, in comparison to the frame 722 of FIG. 9, further includes a third region R3, and other identical or similar arrangements or elements are not repeated here.

The third region R3 is separated from the area the frame 822 by the third division rib 829. The third division rib 829 is connected between the first division rib 726 and the frame 822.

In an embodiment not illustrated in the diagram, the framework structure 82 has a third division rib 829, which is arranged in a vertical manner and connected to the top, the bottom and two sides of the frame 822, wherein the left-hand side of the third division rib 829 is connected to the first division rib 726, and the space surrounded by the right-hand side of the right-hand side and the frame 822 defines the third region R3.

In another embodiment, the framework structure 82 has two third division ribs 829 arranged in a horizontal manner and a vertical manner respectively. As indicated in FIG. 10, the horizontally arranged third division rib 829 is extended rightward from the first division rib 726 at the top and is connected to the frame 822. The vertically arranged third division rib 829 is extended downward from the intersection between the horizontally arranged third division rib 829 and the first division rib 726 and is connected to the frame 822, wherein the top of the third division rib 829 is connected to the first division rib 726. The space surrounded by the two third division ribs 829 and the frame 822 defines the third region R3.

As indicated in FIG. 10, the third region R3 is located at the right-hand side of the first region R1 and corresponds to the number key block 118*e* of the keyboard modules 11, 21 and 31 of FIG. 1A to FIG. 10, respectively. In an embodiment, the third region R3 is completely hollowed, but the present invention is not limited thereto.

The implementation of the framework structure is not limited to the above exemplifications. For example, in other embodiment, the framework structure can be similar to the framework structure 72 of FIG. 9 but the first region R1 surrounded by the rib portion 724 can be completely hollowed (referring to FIG. 3 and FIG. 4) or partly hollowed (referring to FIG. 5 and, FIG. 6). Besides, the first sub-function region R21, the second sub-function region R22 and the third sub-function region R23 of the second region R2 can also be completely hollowed (referring to FIG. 3 and FIG. 5).

According to the framework structure and the keyboard device disclosed in above embodiments of the present invention, the first region and the second region of the frame are separated by a rib portion, such that the keyboard modules for different languages can share the framework structure manufactured using the same mold.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A framework structure applicable to a keyboard module comprising multiple standard keys and multiple function keys, wherein the framework structure comprises:
    a frame correspondingly surrounding the standard keys and the function keys; and
    a rib portion formed in the frame, wherein the rib portion divides the area in the frame into a first region and a second region, the first region corresponds to the area defined by the standard keys of the keyboard module, the second region corresponds to the function keys of the keyboard module, the second region has a first hollowed area and a second hollowed area on opposite sides of the first region respectively, and each of the first hollowed area and the second hollowed area individually covers four rows of the function keys.

2. The framework structure according to claim 1, wherein the first region is hollowed.

3. The framework structure according to claim 1, wherein the framework structure further comprises at least one first division rib arranged between the rib portion and the frame, and the second region is divided into multiple sub-function regions by the first division rib.

4. The framework structure according to claim 3, wherein the first division rib is arranged in a horizontal manner.

5. The framework structure according to claim 3, wherein the framework structure further comprises at least one third division rib arranged between the first division rib and the frame, and a third region corresponding to multiple number keys of the keyboard module is separated from the area in the frame by the third division rib.

6. The framework structure according to claim 5, wherein the third region is hollowed.

7. The framework structure according to claim 1, wherein the framework structure further comprises at least one second division rib extended within the rib portion, and the first region is divided into multiple sub-key regions by the second division rib.

8. The framework structure according to claim 7, wherein the at least one second division rib is adjacently arranged in a horizontal manner.

9. The framework structure according to claim 7, wherein the at least one second division rib is adjacently arranged in a horizontal manner and a vertical manner.

10. The framework structure according to claim 7, wherein the sub-key regions respectively correspond to one of the standard keys of the keyboard module.

11. A keyboard device, comprising:
    a keyboard module, comprising a bottom plate, and multiple standard keys and function keys arranged on the bottom plate; and
    a framework structure, comprising multiple connection structures, wherein the framework structure is coupled with the bottom plate of the keyboard module through the connection structures, and further comprises:
    a frame, correspondingly surrounding the keyboard module; and
    a rib portion formed in the frame, wherein the rib portion divides the area in the frame into a first region and a second region, the first region corresponds to the area defined by the standard keys of the keyboard module, the second region corresponds to the function keys of the keyboard module, the second region has a first hollowed area and a second hollowed area on opposite sides of the first region respectively, and each of the first hollowed area and the second hollowed area individually covers four rows of the function keys.

12. The keyboard device according to claim 11, wherein the first region is hollowed.

13. The keyboard device according to claim 11, wherein the framework structure further comprises at least one first division rib arranged between the rib portion and the frame, and the second region is divided into multiple sub-function regions by the first division rib.

14. The keyboard device according to claim 13, wherein the first division rib is arranged in a horizontal manner.

15. The keyboard device according to claim 14, wherein the framework structure further comprises at least one third division rib arranged between the first division rib and the frame, and a third region corresponding to multiple number keys of the keyboard module is separated from the area in the frame by the third division rib.

16. The keyboard device according to claim 15, wherein the third region is hollowed.

17. The keyboard device according to claim 11, wherein the framework structure further comprises at least one second division rib extended within the rib portion, and the first region is divided into multiple sub-key regions by the second division rib.

18. The keyboard device according to claim 17, wherein the at least one second division rib is adjacently arranged in a horizontal manner.

19. The keyboard device according to claim 17, wherein the at least one second division rib is adjacently arranged in a horizontal manner and a vertical manner.

20. The keyboard device according to claim 17, wherein the sub-key regions respectively correspond to one of the standard keys of the keyboard module.

* * * * *